US006217228B1

(12) United States Patent
Samela et al.

(10) Patent No.: US 6,217,228 B1
(45) Date of Patent: Apr. 17, 2001

(54) FIBER CHANNEL DRIVE ADAPTER

(75) Inventors: Francis M. Samela, Lombard; Robert Skepnek, Norridge, both of IL (US)

(73) Assignee: Stratos Lightwave, Inc., Chicago, IL (US)

( * ) Notice: Subject to any disclaimer, the term of this patent is extended or adjusted under 35 U.S.C. 154(b) by 0 days.

(21) Appl. No.: 09/353,529

(22) Filed: Jul. 14, 1999

(51) Int. Cl.[7] .................................................. G02B 6/38

(52) U.S. Cl. ................................ 385/59; 359/55; 359/71; 359/134; 359/135; 359/136; 359/137; 174/35 C; 361/806; 438/138; 438/752; 439/101

(58) Field of Search ................................ 385/55, 59, 71, 385/134, 135, 136, 139; 439/101; 438/138, 752; 361/806; 174/35 C

(56) References Cited

U.S. PATENT DOCUMENTS

| | | | |
|---|---|---|---|
| 5,356,300 | 10/1994 | Costello et al. | 439/101 |
| 5,547,385 | 8/1996 | Spangler et al. | 439/101 |
| 5,717,533 | 2/1998 | Poplawski et al. | 361/752 |
| 5,778,121 * | 7/1998 | Hyzin | 385/55 |
| 5,879,173 | 3/1999 | Poplawski et al. | 438/138 |

* cited by examiner

*Primary Examiner*—Cassandra Spyrou
*Assistant Examiner*—Craig Curtis
(74) *Attorney, Agent, or Firm*—Steven M. Evans; David L. Newman

(57) ABSTRACT

An interface is provided, the interface having at least two form factors—one for interfacing to a connector on a fiber channel drive and one or more other form factors for interfacing to one or more other styles of connectors. The first form factor is on a first part of the printed circuit board and the others are on a second part of the printed circuit board. Further, the first part of the printed circuit board is on one side of the printed circuit board and the other part of the printed circuit board is on an opposite side. Further, one or more non-SCA connectors are mounted on a front side of a substrate for receiving one or more non-SCA style connectors and an SCA2 receptacle is mounted on the back side of the substrate for interfacing the non-SCA connector an SCA connector on a fiber channel cable. Further, the non-SCA2 connector can include a DB9 receptacle, a high speed serial data connector (HSSDC), or RJ-45. Further, the fiber channel drive can receive a media interface adapter (MIA).

18 Claims, 3 Drawing Sheets

FIBER CHANNEL DRIVE ADAPTER

TECHNICAL FIELD

The present invention relates to a fibre channel drive, and in particular, to the pluggability of that drive.

BACKGROUND

Fibre Channel is the name of an integrated set of standards developed by the American National Standards Institute (ANSI) which defines new protocols for flexible information transfer. Fibre channel is an open industry standard serial interface for high speed systems. One can view fibre channel simply as a transport vehicle for the supported command set (usually SCSI commands). In fact, fibre channel is unaware of the content of the information being transported. It simply packs data in frames, transports them to the appropriate devices, and provides error checking. It is also called Fibre Channel-Arbitrated Loop (FC-AL).

One popular connector interface is a single connector attachment SCA. The SCA interface was designed to provide a standard connection for systems using hot-swappable drives. The original SCA was followed by a second version called the SCA2, which includes alignment posts for grounding on the SCA2 plug and cavities on the SCA2 receptacle for receiving those posts. Unless otherwise specified, the use of the term SCA2 here includes both the original SCA as well as its descendant, the SCA2. Small Computer Systems Interface (SCSI) is the current high end CPU-to-drive interface. SCA2 interface drives connect to a SCSI backplane that provides power, configuration settings such as SCSI ID, and termination of the SCSI bus. An SCA2 adapter is necessary to attach an SCA2 interface drive to a standard SCSI host adapter. An SCA2 adapter should provide power and termination as well as jumper settings for SCSI ID and other drive features. Some drive models may offer configuration options on the drive.

State-of-the-art fibre channel drives come with a single connector adapter. This SCA2 has 40 connections. Other numbers of contacts are also common: 80, 120, etc.

There is no adapter which allows one to connect a fibre channel drive to anything but an SCA2 receptacle.

SUMMARY OF THE INVENTION

Objects of the present invention include providing an interface to a fibre channel drive, the interface having at least two form factors—one for interfacing to a connector on a fibre channel drive and one or more others for interfacing to one or more other styles of connectors.

Another object is to provide an interface having a first form factor on a first side of a printed circuit board and one or more other form factors on an opposite side of the printed circuit board for allowing the first to interface to a connector on a fibre channel drive and the others to interface to other styles of connector.

Another object is to provide an interface between a DB9 receptacle and a fibre channel drive.

Another object is to provide an interface having an SCA style form factor on a first part of a printed circuit board which can mate to a fibre channel drive and a DB9 style receptacle on another part of said printed circuit board for connecting to a DB9 connector on a fibre channel cable.

According to the present invention, an interface is provided, the interface having at least two form factors—one for interfacing to a connector on a fibre channel drive and one or more other form factors for interfacing to one or more other styles of connectors. In further accord with the present invention, the first form factor is on a first part of the printed circuit board and the others are on a second part of the printed circuit board. In further accord with the present invention, the first part of the printed circuit board is on one side of the printed circuit board and the other part of the printed circuit board is on an opposite side. In further accord with the present invention, one or more non-SCA connectors are mounted on a front side of a substrate for receiving one or more non-SCA style connectors and an SCA2 receptacle is mounted on the back side of the substrate for interfacing the non-SCA connector an SCA connector on a fibre channel drive. In still further accord with the present invention, the non-SCA2 connector is a DB9 receptacle. In still further accord with the present invention, that non-SCA2 connector is a high speed serial data connector (HSSDC). In still further accord with the present invention, that fibre channel drive of the present invention receives a media interface adapter (MIA). In still further accord with the present invention, the non-SCA connector is an RJ-45 connector.

An advantage is that fibre channel drives are no longer restricted to interfacing to SCA style receptacles.

Another advantage is that fibre channel drives, normally adapted to interfacing to copper media, can interface to optical media without using an SCA receptacle.

Another advantage of the present invention is that an SCA style connector on a fibre channel drive can use a single interface to mate with one or more connectors having form factors other than an SCA style form factor including high speed serial data connectors (HSSDC), media interface adapter (MIA) style connectors, RJ-45 style connectors or DB9 style connectors.

Other advantages include a direct interface from a copper link to a fibre channel drive, a direct interface from an optical link to a fibre channel drive, configurability by means of the programmable header of the interface between the drive and non-SCA2 receptacle, and the provision of power to the fibre channel drive through a power plug.

These and other objects, features and advantages will become more apparent in light of the drawings and accompanying text.

DETAILED WRITTEN DESCRIPTION OF A PRESENTLY PREFERRED EMBODIMENT

Figure 1:
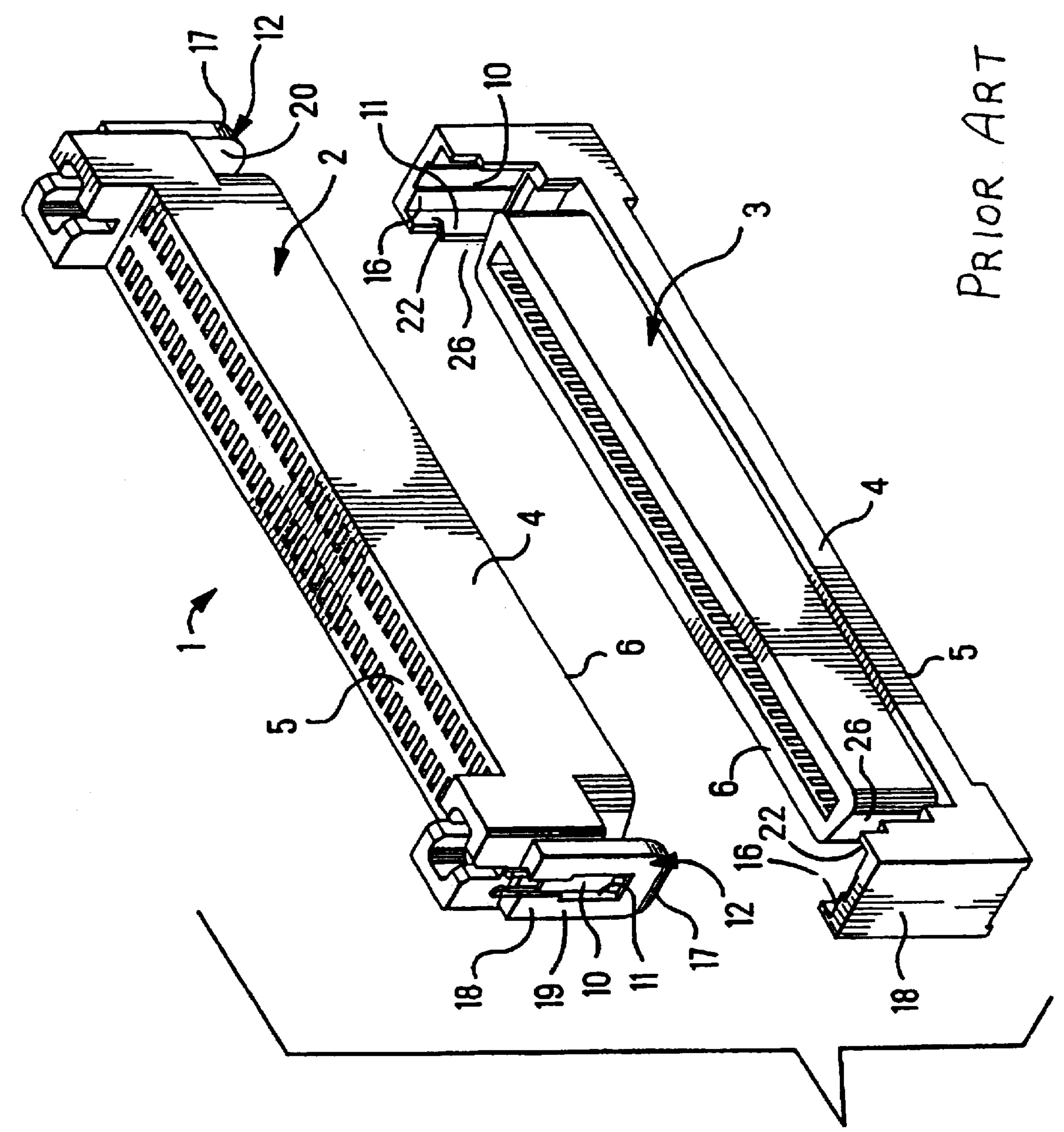
FIG. 1 is an isometric view of a prior art electrical connector assembly comprising an electrical connector and a mating electrical connector, with ground contacts extending along guide posts of the first electrical connector, and with ground contacts along channels in the mating electrical connector.

With reference to FIG. 1, a prior art SCA2 electrical connector assembly 1 that is presently used with Fibre Channel Disk drives and is mounted to the adapter of the present invention. The connector comprises an electrical connector 2 and another, mating electrical connector 3; each of which connectors 2, 3 comprises an insulating housing 4 having a rear face 5 and a mating face 6; and electrical signal contacts 7, in and extending through contact receiving cavities through the housing 4 extend from the rear face 5 toward and to the mating face 6.

Each electrical connector 2, 3 further comprises electrical terminals on rear ends of the electrical contacts 7 that project from the rear face 5 for connection to a circuit board, not shown. Each connector 2, 3 further comprises electrical ground contacts 10 extending in and through ground contact receiving cavities 11 in end portions 18 of the housing 4.

Each electrical connector 2 comprises insulative posts 12 and the conductive ground contacts 10 extending along the posts 12. The ground contacts 10, together with the electrical contacts 7, extend through the housing 4 and through the rear face 5. Electrical terminals 13 on the ground contacts 10 project from the rear face 5 of the housing 4 for connection to a circuit board, not shown. The connector 2 in FIG. 1 that uses the bifurcated terminal 13 is a straddle mount version of the connector 2. The posts 12 and the ground contacts 10 project in the same direction as the mating face 6 to establish a ground connection of the ground contacts 10 when the connectors 2, 3 are mated. A shroud 14 on the housing 4 encircles the signal contacts 7 at the mating face 6. The ground contacts 10 engage the mating ground contacts 10 in the mating electrical connector 3 while the posts 12 engage the mating electrical connector 3. The shrouds 14 of the connectors overlap, with the shroud 14 on the connector 2 encircling the shroud 14 on the connector 3. For example, the connector 2 is a plug connector, and the connector 3 is a receptacle connector.

In the mating electrical connector 3, the cavities 11 define post receiving cavities to receive the posts 12 and are in the form of channels on the mating electrical connector 3. The ground contacts 10 are in grooved recesses of the channels, and face opposite open sides of the channels. Open ends 16 of the channels are spaced apart to correspond with the spacing between tips 17 of the posts 12. The ground contacts 10 in the channels receive and engage the ground contacts 10 along the posts 12 upon receipt of the posts 12 along the channels. The posts 12 project so as to align the mating face 6 of the connector 2 with that of the mating electrical connector 3 while the mating faces 6 are spaced apart, and posts 12 and the channels are at opposite ends 18 of connectors 2,3.

Figure 2:
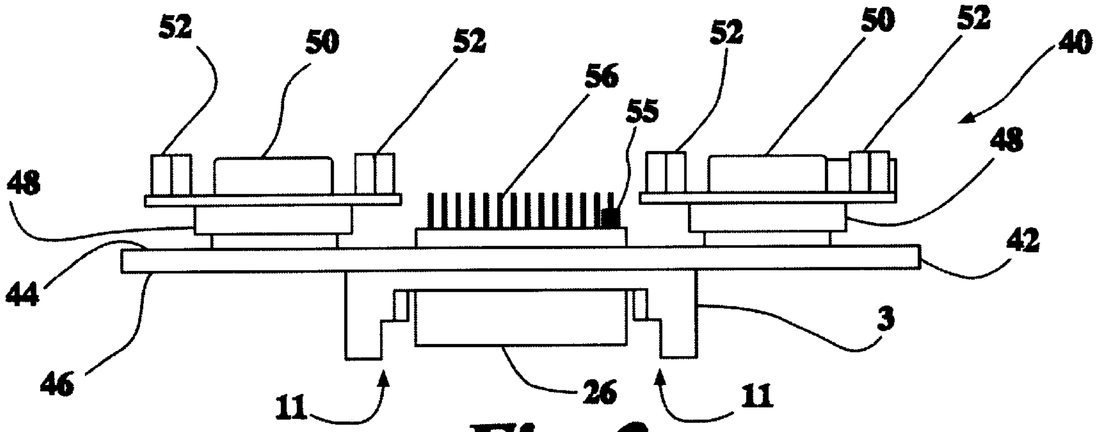
FIG. 2 is a top view of the fibre channel adapter according to the present invention having an SCA2 receptacle and DB9 receptacle.

With reference to FIGS. 1 and 2, alignment of the respective connectors 2, 3, end 18 to end 18, is accomplished by viewing along the posts 12 as sights to target where the posts 12 will align to assure insertion of the posts 12 into the open ends 16 of the channels. The mating connector 3 is often hidden from view inside a chassis, not shown, requiring the posts 12 to enter the chassis through an opening in the chassis. The posts 12 permit alignment of the connectors 2, 3 when the mating connector 3 is hidden from view. The posts 12 thereby facilitate blind mating connection of the connectors 2, 3. An exterior surface 19 of each post 12 is flat for a major portion of its length from back to front, and is tapered with a rounded taper forwardly and inwardly along its length, the taper merging with the tip 17 of the post 12. The surfaces 19 face outwardly away from each other. The ground contacts 10 extend along the surfaces 19. An inward facing surface 20 of the post 12 merges with the surface 19 at the tip 17. The surfaces 20 of the posts 12 face each other. The ground contact receiving cavity 11 is a closed end channel in the surface 19 that communicates with one of the ground contact receiving cavities in the housing 4. The closed end is adjacent to the tip 17. A ground contact 10 extends within the channel and along the surface 19 at the tip 17. The post 12 partially surrounds the portion of the ground contact 10 within the channel.

The ground contacts 10 are stamped and formed from a blank of metal and are unitary with a carrier strip, not shown. Each ground contact 10 is separated from the carrier strip. An outwardly curved contact surface on the ground contact 10 in the connector 2 projects outwardly of the channel to engage a ground contact 10 on the mating electrical connector 3, when the posts 12 and the ground contacts 10 along the posts 12 are received along the cavities 11 of the mating connector 3 for connection with the ground contacts 10 in the recessed groove portion of the cavities 11 of the mating connector 3.

With reference to FIG. 1, the electrical connector 3 is an electrical receptacle connector having the cavities 11 and the ground contacts 10 projecting outwardly beyond the mating face 6 to align the mating faces of connectors 2 and 3 and to establish a ground connection of the ground contacts 10 to the ground contacts 10 in the posts 12, while the mating faces 6 of connectors 2,3 are spaced apart.

With reference to FIG. 1, the ground contact receiving cavities 11 on the connector 3 project beyond the mating face 6 to receive the posts 12 prior to mating of the connectors 2, 3. The ground contacts 10 in the cavities 11 project beyond the mating face 6 of the connector 3 to engage the ground contacts 10 in the posts 12 prior to mating of the connectors 2 and 3. An insulating funnel 22 is on the open end of each of the ground contact receiving cavities 11 in the mating connector 3. The ground contact 10 in each of the cavities 11 is recessed from the open end. Because the ground contacts 10 of both connectors 2, 3 are positioned rearwardly, when the posts 12 are inserted along the cavities 11 of the mating connector 3, the open ends of the cavities 11 will be covered by the posts 12 before the ground contacts 10 of the connectors 2, 3 become engaged. Thereby, the ground contacts and the cavities 11 will be covered safely in the event that electrical arcing might occur when the ground contacts 10 of the connectors 2, 3 approach one another during mating connection.

Prior to connecting the signal contacts along the mating face 6 of the connector 2 with those of the mating electrical connector 3, the ground contacts 10 on the alignment posts 12 engage the ground contacts 10 in the mating electrical connector 3. The ground contacts 10 of the mating connector 3 are connected to chassis ground electrical potential. When the ground contacts 10 of the connectors 2, 3 are engaged, the ground connections of the connector 2 to chassis ground potential are established before the contacts 7 of the connector 2 engage the contacts 7 of the mating connector 3. It can be said of the invention that the subsequent contacts 7, combined with the prior connection of the longer ground contacts 10, provide at least two levels of sequenced electrical connections with the mating electrical connector 3. The contacts 7 are protected from electrostatic charges when such charges discharge to chassis ground. In addition, the connection of the contacts 7 in the respective connectors 2, 3 can be accomplished when the contacts 7 of the mating connector are part of an activated electrical circuit, not shown.

This feature discharges electrostatic charges through the engaged ground contacts 10 to isolate the electrical contacts 7 from such charges during connection and disconnection of the connector 2 and the mating electrical connector 3, especially useful when the contacts 7 of one of the connectors 2, 3 is part of an activated electrical circuit, not shown.

Each connector 2 is capable of being modified to provide a desirable feature wherein mating connection of the electrical contacts 7 themselves of the connectors 2, 3 will occur in sequence. Selected electrical contacts 7 in the connector 2 are positioned forward and closer to the mating face 6 than are the remainder of the electrical contacts 7 when the connector 2 is being viewed from the mating face 6. As the connectors 2, 3 are moved toward each other for mating connection, the forward contacts 7 will engage respective contacts 7 of the other mating connector 3 before the remainder of the contacts 7 in the connector 2 become engaged with the remainder of the contacts 7 of the mating connector 3. This feature provides another level of sequenced electrical connection when the connectors 2, 3 are urged toward one another for mating connection.

FIG. 2 is a top view of the fibre channel adapter 40 according to the present invention. FIG. 2 shows a fibre channel adapter 40 including a substrate 42 having a front 44 and a back 46. The front 44 has two DB9 receptacles 48 having input sides 50 for receiving a fibre channel cable DB9 plug. The DB9 plug which connects into the DB9 receptacle 48 of the fibre channel adapter 40 typically has four active pins. Two of those four pins are for transmitting and two are for receiving. Each of the DB9 receptacles 48 include holes 52 for receiving attachment means which can pass through holes in the substrate 42 and then into, for example, a motherboard. Also shown on the front 44 of substrate 42 are sixteen pins 56 of a programmable pin header 57. FIG. 2 shows eight pins 56 and these eight hide a second set of eight that stand behind the first set of eight which are visible in FIG. 2. Placing a removable shunting member 55 across corresponding pairs of pins 56 of the first and second sets establishes an electrical connection which can be disconnected simply by removing the removable shunting member 55.

On the back 46 of substrate 42, is a forty pin SCA 2 receptacle 3 like that shown in FIG. 1 for mating to an SCA2 plug 2 (FIG. 1). The SCA2 plug is the state of the art interface for fibre channel drives. An SCA2 receptacle 3 includes two cavities 11 for receiving grounding alignment posts 12 (FIG. 1) while the male pins of an SCA2 fit into a central D-shell 26.

Figure 3:
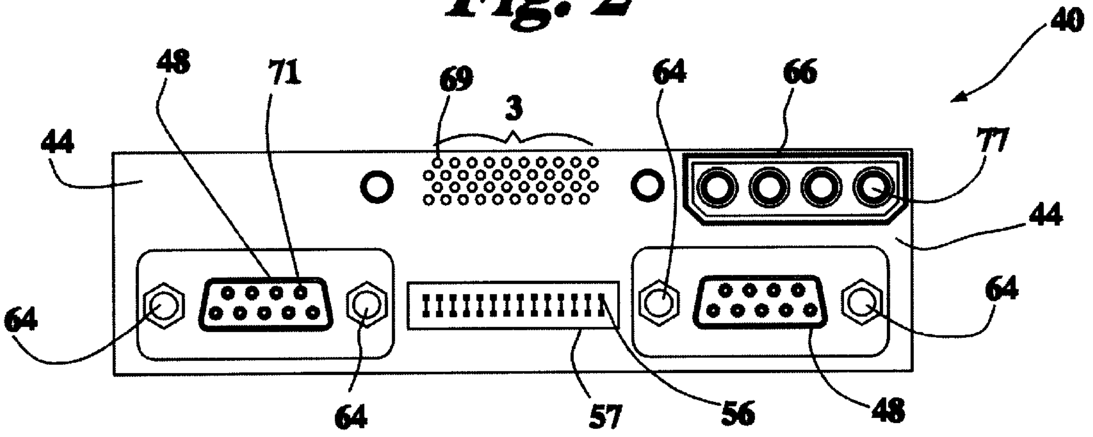
FIG. 3 is a front view of the fibre channel adapter according to the present invention having an SCA2 receptacle and DB9 receptacle for receiving an MIA.

FIG. 3 is a front view of the fibre channel adapter 40 according to the present invention. DB9 receptacles 48 are attached by connection means 64 to substrate 42. Adjacent one of the DB9 receptacles 48 is a power jack 66 having four power terminals 77, two grounded, one at plus twelve volts and the other at plus five volts. Adjacent the power jack 66 is the SCA2 receptacle 3. Its pins 69 are shown emerging from the front 44 of substrate 42. Located between the DB9 receptacles 48 is a pin header 57 for configuring the connection of the SCA2 receptacle 58 to the DB9 receptacles 48.

Figure 4:
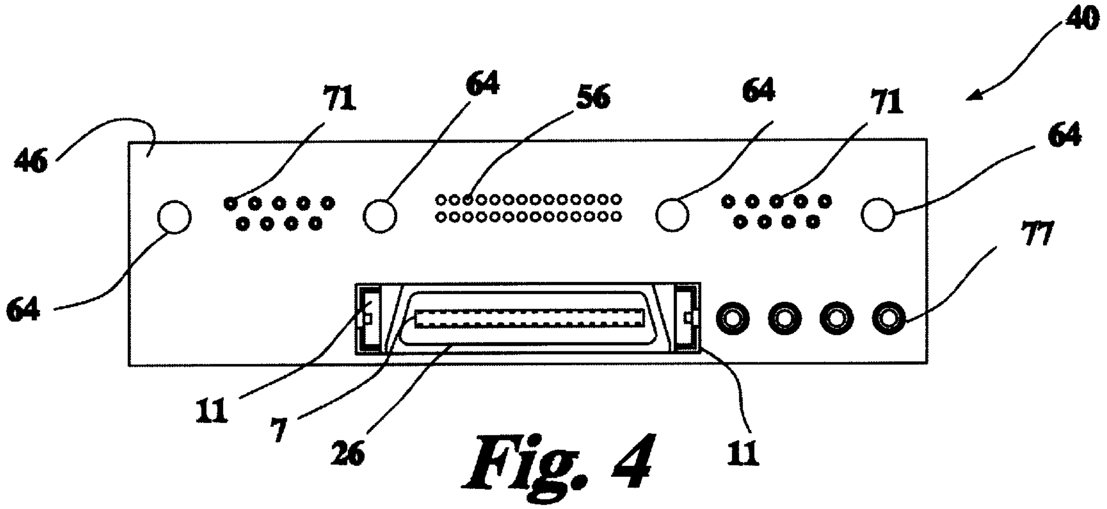
FIG. 4 is a back view of the fibre channel adapter according to the present invention having an SCA2 receptacle and DB9 receptacle.

FIG. 4 is a view of the back 46 of the fibre channel adapter 40 according to the present invention. Pins 71 from the DB9 receptacles 48 are shown as well as pins 56 from the pin header 57, and pins 77 of the power jack 66. SCA2 receptacle 3 includes a D-shell 26 that receives an SCA2 plug 2 on a fibre channel drive. The PCB is formed with circuitry to allow for the signals in a fibre channel drive to be coupled through the SCA2 connector 3 to the pair of DB-1 connectors 48. The PCB provides power, termination and jumper circuitry for SCS1 ID and other features.

Figure 5:
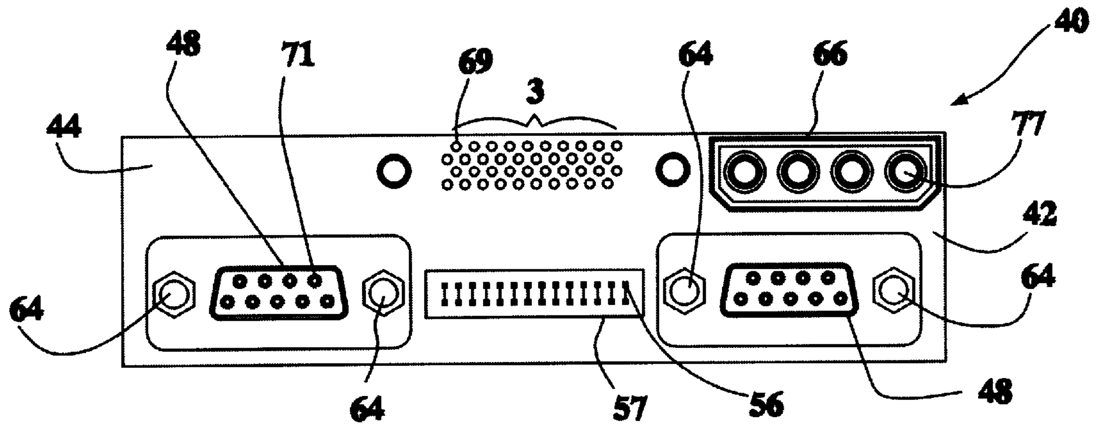
FIG. 5 is a front view of the fibre channel adapter according to the present invention having an SCA2 receptacle and DB9 receptacle.

FIG. 5 is a top view of the fibre channel adapter 40 according to the present invention adapted to receive a media interface adapter (MIA). A media interface adapter, as is known in the art, is attached to an optical fiber for providing a signal from that optical fiber to a DB9 plug (or sometimes a DB 9 receptacle) which, in turn, allows the optical fiber to be provided to a copper medium using fibre channel. FIG. 5 shows a fibre channel adapter 40 having the substrate 42 and front 44 and back 46. The front 44 has two DB9 receptacles 48 are for receiving not a fibre channel cable DB9 as in FIGS. 2–4, but rather an MIA. Therefore, FIG. 5 appears generally the same as FIG. 3 although electrically the two are a little different in that the substrate 42 provides power and ground to the DB9 receptacle 48, causing two more contacts out of nine of the DB9 receptacle to be active. FIG. 5 is a front view of the fibre channel adapter 40 according to the present invention. DB9 receptacles 48 are attached by connection means 64 to substrate 42. Adjacent one of the DB9 receptacles 48 is power jack 66 having four power terminals 77, two grounded, one at plus twelve volts and the other at plus five volts. Adjacent the power jack 66 is the SCA2 receptacle 3. Its pins 69 are shown emerging from the front 44 of substrate 42. Located between the DB9 receptacles 48 is a pin header 57 for configuring the connection of the SCA2 receptacle 3 to the DB9 receptacles 48.

Figure 6:
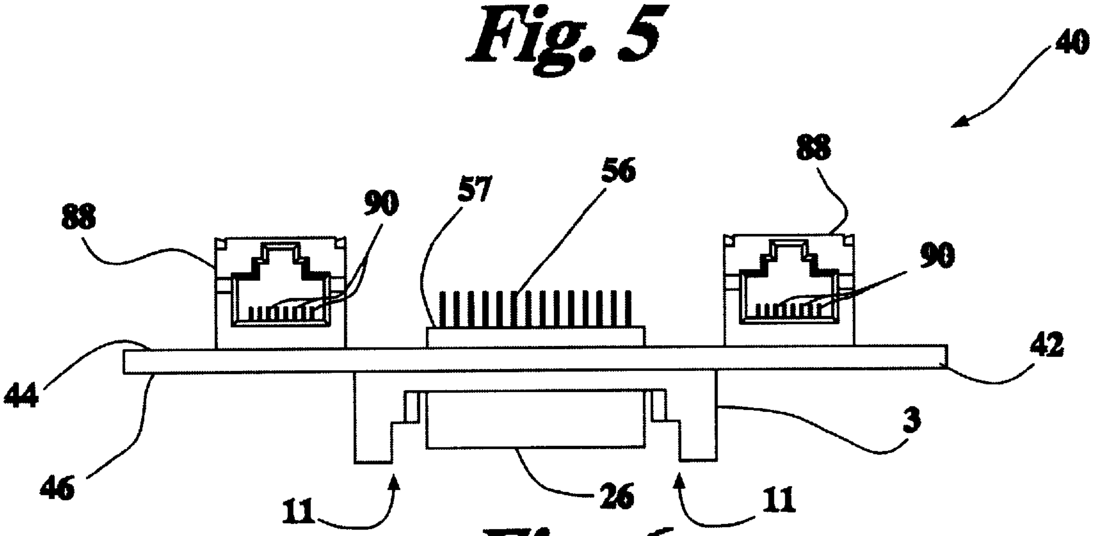
FIG. 6 is a top view of the fibre channel adapter according to the present invention having an SCA2 receptacle and RJ-45 receptacle.

FIG. 6 is a top view of the fibre channel adapter 40 according to the present invention adapted to receive an RJ-45 jack. Thus, in each of FIGS. 2–5, a different non-SCA2 receptacle is substituted on either side of the pin header 57. FIG. 6 shows a fibre channel adapter 40 having substrate 42, front 44, and back 46. The front 44 has two RJ-45 receptacles 88 for receiving not a fibre channel cable DB9 as in FIGS. 1–3, but rather an RJ-45 plug (not shown). Therefore, FIG. 6 appears generally the same as FIG. 2 except that RJ-45 receptacle 88 replaces the DB9 receptacle 48 shown in FIG. 1. The RJ-45 receptacles 88 are attached by any suitable means to substrate 42 and are mounted so that the direction of plugging is at a right angle to the substrate 42. Each RJ-45 receptacle 88 includes mating contacts 90 for mating an RJ-45 to a fibre channel drive. Located between the RJ-45 receptacles 88 is a pin header 57 for configuring the connection of the SCA2 receptacle 3 to the RJ-45 receptacles 88.

Figure 7:
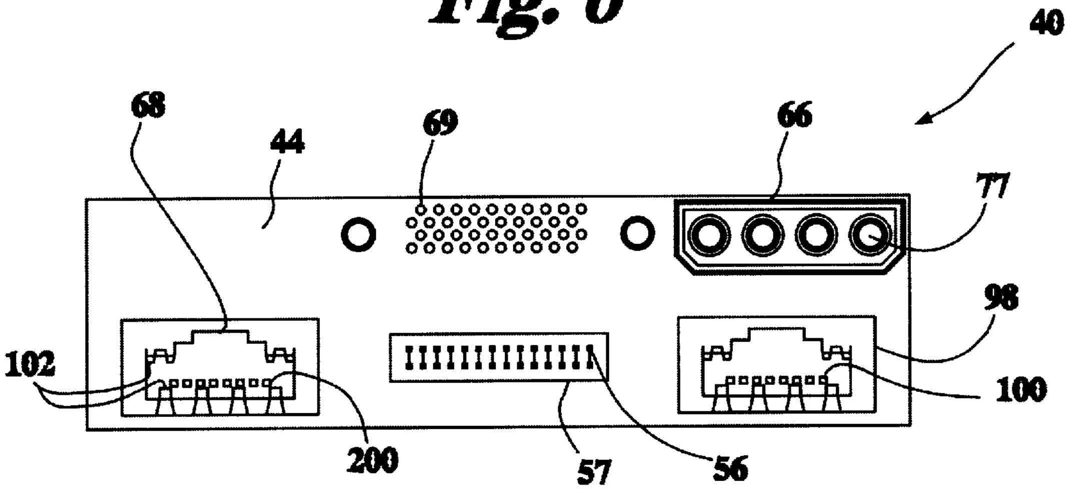
FIG. 7 is a front view of the fibre channel adapter according to the present invention having an SCA2 receptacle and HSSDC receptacle.

FIG. 7 shows the fibre channel adapter 40. The non-SCA2 receptacle can be an RJ-45 receptacle as in FIG. 6 or HSSDC receptacles 98 as shown in FIG. 7. HSSDC receptacles 98 include mating contacts 100 for receiving an HSSDC plug (not shown). As known in the art, flanges 102 in the HSSDC receptacles 98 are pushed aside by a head portion of the HSSDC plug when inserted into the HSSDC receptacle 98 and spring back around a neck portion of an HSSDC plug when further inserted into an HSSDC receptacle 98.

It should be understood that the basic concept described here is an SCA2 attached to one side of a substrate that has on its other side a non-SCA2 receptacle. That non-SCA2 receptacle can include an RJ-45, a DB9, an HSSDC receptacle, an MIA receptacle and others without departing from the spirit and scope of the invention.

Furthermore, it should be understood that various changes and modifications to the presently preferred embodiments described herein would be apparent to those skilled in the art. Such changes and modifications may be made without departing from the spirit and scope of the present invention and without diminishing its attendant advantages. It is, therefore, intended that such changes and

What is claimed is:

1. A fibre channel drive adapter comprising:

a substrate having mounted thereon a Single Connector Attachment (SCA2) for receiving a fibre channel connector, and said substrate having mounted thereon a non-SCA2 receptacle, such that signals received by a fibre channel drive via the SCA2 receptacle pass to the non-SCA2 receptacle and devices connected thereto.

2. The fibre channel drive adapter of claim 1 wherein the non-SCA2 receptacle is an RJ-45 style receptacle.

3. The fibre channel drive adapter of claim 1 wherein the non-SCA2 receptacle is a high speed serial data connection (HSSDC style) receptacle.

4. The fibre channel drive adapter of claim 1 wherein the non-SCA2 receptacle is a DB9 receptacle.

5. The fibre channel drive adapter of claim 1 wherein the non-SCA2 receptacle is a DB9 receptacle and said substrate is configured such that a fibre channel drive is interfaced to a media interface adapter (MIA) received at said DB9 receptacle.

6. The fibre channel drive adapter of claim 1 wherein the SCA2 receptacle and the non-SCA2 receptacle are on the same side of the substrate.

7. The fibre channel drive adapter of claim 1 wherein the SCA2 receptacle and the non-SCA2 receptacle are on the opposite sides of the substrate.

8. A fibre channel adapter, comprising:

a substrate;

a Single Connector Attachment (SCA) for receiving a fibre channel connector mounted to the substrate; and a non-SCA receptacle mounted to the substrate, such that signals received over a fibre channel via the SCA receptacle pass to the non-SCA receptacle and a device connected thereto.

9. The fibre channel adapter of claim 8, wherein the non-SCA receptacle is an RJ-45 style receptacle.

10. The fibre channel adapter of claim 8, wherein the non-SCA receptacle is a high speed serial data connection (HSSDC style) receptacle.

11. The fibre channel adapter of claim 8, wherein the non-SCA receptacle is a DB9 receptacle.

12. The fibre channel adapter of claim 8, wherein the non-SCA receptacle is a DB9 receptacle and said substrate is configured such that a fibre channel drive is interfaced to a media interface adapter (MIA) received at said DB9 receptacle.

13. The fibre channel adapter of claim 8, wherein the SCA receptacle and the non-SCA receptacle are on the same side of the substrate.

14. The fibre channel adapter of claim 8, wherein the SCA receptacle and the non-SCA receptacle are on the opposite sides of the substrate.

15. The fibre channel adapter of claim 8, further comprising:

a power jack mounted to the substrate, such that electrical power can pass between a fibre channel via the SCA receptacle and a device connected to the non-SCA receptacle.

16. The fibre channel adapter of claim 15, wherein the power jack includes a plurality of pins for communicating electrical power.

17. The fibre channel adapter of claim 15, wherein the non-SCA receptacle and the power jack are on the same side of the substrate.

18. The fibre channel adapter of claim 8, wherein the SCA receptacle is a SCA2 type receptacle.

* * * * *